United States Patent
Yao et al.

(10) Patent No.: US 11,162,439 B2
(45) Date of Patent: Nov. 2, 2021

(54) CONTROL METHOD OF VARIABLE STROKE ENGINE FOR REFORMING HIGH-OCTANE FUEL UNDER THE FLEXIBLE CYLINDER ENGINE (FCE) MODE

(71) Applicant: TIANJIN UNIVERSITY, Tianjin (CN)

(72) Inventors: Mingfa Yao, Tianjin (CN); Yang Wang, Tianjin (CN); Hu Wang, Tianjin (CN); Haifeng Liu, Tianjin (CN); Zunqing Zheng, Tianjin (CN); Shan Mi, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 16/301,721

(22) PCT Filed: Mar. 23, 2018

(86) PCT No.: PCT/CN2018/080318
§ 371 (c)(1),
(2) Date: Nov. 14, 2018

(87) PCT Pub. No.: WO2019/119666
PCT Pub. Date: Jun. 27, 2019

(65) Prior Publication Data
US 2021/0095604 A1    Apr. 1, 2021

(30) Foreign Application Priority Data

Dec. 22, 2017  (CN) .......................... 201711414248.2

(51) Int. Cl.
*F02D 15/02*      (2006.01)
*F02B 75/02*      (2006.01)
(Continued)

(52) U.S. Cl.
CPC .............. *F02D 15/02* (2013.01); *F02B 75/02* (2013.01); *F02B 75/048* (2013.01);
(Continued)

(58) Field of Classification Search
CPC ......... F02B 75/048; F02B 75/02; F02D 15/02
See application file for complete search history.

(56) References Cited

U.S. PATENT DOCUMENTS

| 9,650,976 B2 * | 5/2017 | Gingrich ................ F02M 26/05 |
| 2015/0337696 A1 * | 11/2015 | Glugla .................... F02D 21/08 123/574 |
| 2017/0145966 A1 | 5/2017 | Yao et al. |

OTHER PUBLICATIONS

Development of Gasoline Direct Injection Engine, Y. Iwamoto et al., published on Feb. 24-27, 1997, p. 1-p. 17.
(Continued)

*Primary Examiner* — Kevin A Lathers
(74) *Attorney, Agent, or Firm* — Dragon Sun Law Firm, PC; Jinggao Li, Esq.

(57) ABSTRACT

The present invention discloses a control method of variable stroke engine for reforming high-octane fuel under the FCE mode, the ECU connected to the engine controls the amount of fuel injected from the flexible cylinder injector to the flexible cylinder and controls the switch state of inlet valve and exhaust valve of the flexible cylinder, so that the flexible cylinder can be switched between two-stroke mode and four-stroke mode according to the actual engine operating conditions; when the engine is at a small load and needs to promote combustion stability, the flexible cylinder injector injects a rich fuel with equivalence ratio greater than 1 into the flexible cylinder, the flexible cylinder is at two-stroke mode; when the engine is at a large load and needs sufficient power output, the flexible cylinder injector injects a conventional fuel into the flexible cylinder, said flexible cylinder is at four-stroke mode.

3 Claims, 2 Drawing Sheets

(51) Int. Cl.
  *F02B 75/04* (2006.01)
  *F02D 13/02* (2006.01)
  *F02D 41/38* (2006.01)
  *F02M 31/20* (2006.01)
  *F02M 35/10* (2006.01)
(52) U.S. Cl.
  CPC ....... *F02D 13/0203* (2013.01); *F02D 13/028* (2013.01); *F02D 41/38* (2013.01); *F02M 31/20* (2013.01); *F02M 35/10157* (2013.01); *F02M 35/10222* (2013.01); *F02M 35/10255* (2013.01); *F02B 2075/025* (2013.01); *F02B 2075/027* (2013.01); *F02D 2041/389* (2013.01)

(56) References Cited

OTHER PUBLICATIONS

PCCI Operation with Early Injection of Conventional Diesel Fuel, Tomohiro Kanda et al., published on Apr. 11-14, 2005, 2005-01-0378.

Fuel reactivity controlled compression ignition (RCCI): a pathway to controlled high-efficiency clean combustion, S L Kokjohn et al. published on Nov. 15, 2010.

Review of high efficiency and clean reactivity controlled compression ignition (RCCI) combustion in internal combustion engines, Rolf D. Reitz et al.

Investigating the origin of nuclei particles in GDI engine exhausts, Lee Anne Sgro et al.

Homogeneous Charge Compression Ignition (HCCI): Benefits, Compromises, and Future Engine Applications, Rudolf H. Stanglmaier et al., 1999-01-3682.

Homogeneous.Charge Compression. Ignition (HCCI) Engines, R. H. Thrlng.

Review of high efficiency and clean reactivity controlled compression ignition (RCCI) combustion in internal combustion engines, Mingfa Yao et al. Progress in Energy and Combustion Science 46 (2015) 12-71.

Biodiesel engine performance and emissions in low temperature combustion,Ming Zheng et al.

Dedicated EGR: A New Concept in High Efficiency Engines,Terry Alger and Barrett Mangold.

In-cylinder thermochemical fuel reforming (TFR) in a spark-ignition natural gas engine,Lei Zhu et al.

A theoretical investigation of the effects of the low-temperature reforming products on the combustion of n-heptane in an HCCI engine and a constant volume vessel, Yang Wang et al.

PCT 101 request.

* cited by examiner

US 11,162,439 B2

CONTROL METHOD OF VARIABLE STROKE ENGINE FOR REFORMING HIGH-OCTANE FUEL UNDER THE FLEXIBLE CYLINDER ENGINE (FCE) MODE

CROSS-REFERENCE TO RELATED APPLICATIONS

This application is a national stage application of International Patent Application PCT/CN2018/080318, filed Mar. 23, 2018, which itself claims the priority to Chinese Patent Application No. CN 201711414248.2, filed Dec. 22, 2017 in the State Intellectual Property Office of P.R. China, both of which are expressly incorporated by reference herein in their entirety. Some references, which may include patents, patent applications, and various publications, are cited and discussed in the description of the present disclosure. The citation and/or discussion of such references is provided merely to clarify the description of the present disclosure and is not an admission that any such reference is "prior art" to the invention described herein. All references cited and discussed in this specification are incorporated herein by reference in their entireties and to the same extent as if each reference was individually incorporated by reference. In terms of notation, hereinafter, [n] represents the nth reference cited in the reference list. For example, [1] represents the first reference cited in the reference list, namely, [1] Iwamoto Y., et al., Development of gasoline direct injection engine, 1997, SAE technical paper.

FIELD OF THE INVENTION

The present disclosure relates to the engine and in particular to a novel combustion engine under flexible cylinder engine (hereinafter referred to as FCE) mode.

BACKGROUND OF THE INVENTION

Reducing the air pollution caused by vehicle exhaust and increasing fuel efficiency are expanding into global problems. Some scientists in the whole world have put forward different new combustion technologies [1-9], such as homogeneous charge compression ignition (HCCI), partially premixed combustion (PPC), and reactivity controlled compression ignition (RCCI), etc. Actually, all these novel combustion technologies are aimed at achieving high efficiency and energy saving by adjusting the initial operating conditions of the engine or the properties of fuel. The researchers from Southwest Research Institute [10] proposed a dedicated exhaust gas recirculation (D-EGR) strategy to optimize the thermal efficiency and emissions in a gasoline engine. According to the D-EGR strategy, partial gasoline fuel was reformed catalytically to H2 and CO in a dedicated cylinder firstly, which are then routed with fresh gasoline into other cylinders for combustion. The results exhibited that the average thermal efficiency was increased by 12-15% with the adoption of D-EGR strategy. The D-EGR strategy improves the combustion efficiency of engine and reduces emission are because the reformed fuel is rich in hydrogen, thus increasing the laminar burning velocity of the mixed fuel and widening the air-fuel ratio of the fuel. The researchers of Shanghai Jiaotong University [11] developed a new combustion mode of thermochemical fuel reforming (TFR), and verified it in a natural gas engine experimentally. H2 and CO were produced by reformed nature gas in a separate cylinder, and then mixed with fresh fuel to be introduced into other cylinders. The research revealed that the emissions of BSHC, BSCO and BSNOX were eliminated by 12%, 8% and 35%, respectively.

However, the engine should be flexibly adjusted over a wide range to adapt to the operating conditions. Dual-fuel combustion mode and catalytic reforming mode can satisfy this demand, but the above modes require an additional fuel tank or a catalytic reforming device, which will increase the vehicle's load. Based on this combustion strategy, a Chinese patent application named "novel engine controlled by combustion reaction path and regulating method thereof", publication No. is CN105134373 and publication date is Dec. 9, 2015, discloses a flexible cylinder engine strategy [12-13].

REFERENCES

[1] Iwamoto Y, et al., Development of gasoline direct injection engine, 1997, SAE technical paper.
[2] Kanda T., et al., PCCI operation with early injection of conventional diesel fuel, 2005, SAE Technical Paper.
[3] Kokjohn S., et al., Fuel reactivity controlled compression ignition (RCCI): a pathway to controlled high-efficiency clean combustion. International Journal of Engine Research, 2011. 12(3): p. 209-226.
[4] Reitz R. D., Duraisamy G, Review of high efficiency and clean reactivity controlled compression ignition (RCCI) combustion in internal combustion engines. Progress in Energy and Combustion Science, 2015. 46: p. 12-71.
[5] Sgro L. A., et al., Investigating the origin of nuclei particles in GDI engine exhausts. Combustion and Flame, 2012. 159(4): p. 1687-1692.
[6] Stanglmaier R. H., Roberts C. E., Homogeneous charge compression ignition (HCCI): benefits, compromises, and future engine applications, 1999, SAE Technical Paper.
[7] Thring R. H., Homogeneous-charge compression-ignition (HCCI) engines, 1989, SAE Technical paper.
[8] Yao M. F., Zheng Z, Liu H. F., Progress and recent trends in homogeneous charge compression ignition (HCCI) engines. Progress in Energy and Combustion Science, 2009. 35(5): p. 398-437.
[9] Zheng M., et al., Biodiesel engine performance and emissions in low temperature combustion. Fuel, 2008. 87(6): p. 714-722.
[10] Alger T., Mangold B., Dedicated EGR: a new concept in high efficiency engines. SAE international journal of engines, 2009. 2(2009-01-0694): p. 620-631.
[11] Zhu L., et al., In-cylinder thermochemical fuel reforming (TFR) in a spark-ignition natural gas engine. Proceedings of the Combustion Institute, 2017. 36(3): p. 3487-3497.
[12] Wang Y., Wei L. X., Yao M. F., A theoretical investigation of the effects of the low-temperature reforming products on the combustion of n-heptane in an HCCI engine and a constant volume vessel. Applied Energy, 2016. 181: p. 132-139.
[13] Yao M F, Wang Y, Jia G R, et al. Novel engine controlled by combustion reaction path and regulating method thereof. U. S. patent application Ser. No. 15/268,586.

SUMMARY OF THE INVENTION

The present disclosure discloses a control method of variable stroke engine for reforming high-octane fuel under the FCE mode. The flexible cylinder in the present disclosure can realize two-stroke and four-stroke operation modes conversion by adjusting valves according to the actual operating conditions; when the flexible cylinder acts as a reforming cylinder to reform the high-octane fuel, the operating mode of the flexible cylinder is two-stroke mode which increases the production of reformed fuel to improve the reforming efficiency; when the engine's heavy load requires to output sufficient power, the flexible cylinder converts to four-stroke mode. The present disclosure can switch the flexible cylinder operation mode between two-stroke and four-stroke mode.

In order to overcome the defects of the prior art, the present disclosure provides a control method of variable stroke engine for reforming high-octane fuel under the FCE mode. The engine comprises an air inlet system, a plurality of working cylinders and at least one flexible cylinder; said air inlet system comprises a turbine, a supercharger, a main air inlet pipe connected to the supercharger, a three-way air inlet valve provided on the main air inlet pipe; the main air inlet pipe is divided into two ways via the three-way air inlet valve, one is a working cylinder air inlet pipe, the other is a flexible cylinder air inlet pipe, and a working loop is arranged between the main air inlet pipe and the working cylinder air inlet pipe, a fuel reforming loop is arranged between the working cylinder air inlet pipe and the flexible cylinder air inlet pipe; the process of fuel reforming loop is that the fuel enters into the flexible cylinder air inlet pipe, and successively passes through the flexible cylinder injector, the flexible cylinder, the three-way exhaust valve of the flexible cylinder, the reforming air intercooler, the reforming pipe and finally reaches the mixing chamber; wherein the reforming air intercooler is arranged on the reforming pipe and located between the flexible cylinder and the mixing chamber. The ECU connected to the engine controls the amount of fuel injected from the flexible cylinder injector to the flexible cylinder and controls the switch state of inlet valve and exhaust valve of the flexible cylinder, so that the flexible cylinder can be switched between two-stroke mode and four-stroke mode according to the actual engine operating conditions; when the engine is at a small load and needs to promote combustion stability, the flexible cylinder injector injects a rich fuel with equivalence ratio greater than 1 into the flexible cylinder, said flexible cylinder is at two-stroke mode; when the engine is at a large load and needs sufficient power output, the flexible cylinder injector injects a conventional fuel into the flexible cylinder, said flexible cylinder is at four-stroke mode; wherein:

The process of reforming loop under two-stroke mode is as follows:

Step 1-1): switching off the exhaust valve, switching on the inlet valve, and introducing fresh air into the flexible cylinder;

Step 1-2): when the flexible cylinder reached the bottom dead center (short for BDC), switching off the inlet valve and the exhaust valve, and low-temperature compressing the high-octane fuel to be misfire reformed in the flexible cylinder;

Step 1-3): according to the reactivity curve of the reformed products of the flexible cylinder, selecting the switch-on time of the exhaust valve, deriving the reformed products with corresponding reactivity required by the engine from the flexible cylinder and introducing it into the working cylinders. Wherein the reactivity curve of the reformed products of the flexible cylinder was calculated by CHEMKIN software according to the reactivities of the reformed products are different at the different derivation moments.

The process of reforming loop under four-stroke mode is as follows:

Step 2-1): switching off the exhaust valve, switching on the inlet valve, and introducing fresh air into the flexible cylinder;

Step 2-2): when the flexible cylinder reached the BDC, switching off the inlet valve and the exhaust valve, and low-temperature compressing the high-octane fuel to be misfire reformed in the flexible cylinder;

Step 2-3): travelling down the piston of the flexible cylinder, and providing power to the engine;

Step 2-4): switching on the exhaust valve to exhaust the combusted exhaust gas.

Compared with prior art, the technical scheme of the present disclosure has the following beneficial effects:

The variable stroke engine for reforming high-octane fuel under the FCE mode of the present disclosure can switch the stroke mode according to the specific operating conditions as follows: when the engine is at a small load, the flexible cylinder acts as a reforming cylinder under two-stroke mode to reform the high-octane fuel by regulating the states of valves; when the engine is at a heavy load, the flexible cylinder operates as the conventional cylinders and converts to four-stroke mode. During the reforming mode, the flexible cylinder under two-stroke mode can provide enough reformed products to the conventional cylinders and improves reforming efficiency compared with the flexible cylinder under four-stroke mode.

BRIEF DESCRIPTION OF THE DRAWINGS

FIG. 2 is the state diagram which shows the valves state when the flexible cylinder is under two-stroke mode; wherein FIG. 2a shows the air inlet state, FIG. 2b shows the misfire compressing reforming state, FIG. 2c shows the air exhaust state;

FIG. 3 is the state diagram which shows the valves state when the flexible cylinder is under four-stroke mode; wherein FIG. 3a shows the air inlet state, FIG. 3b shows the compression state, FIG. 3c shows the working state, and FIG. 3d shows the air exhaust state;

Figure 1:
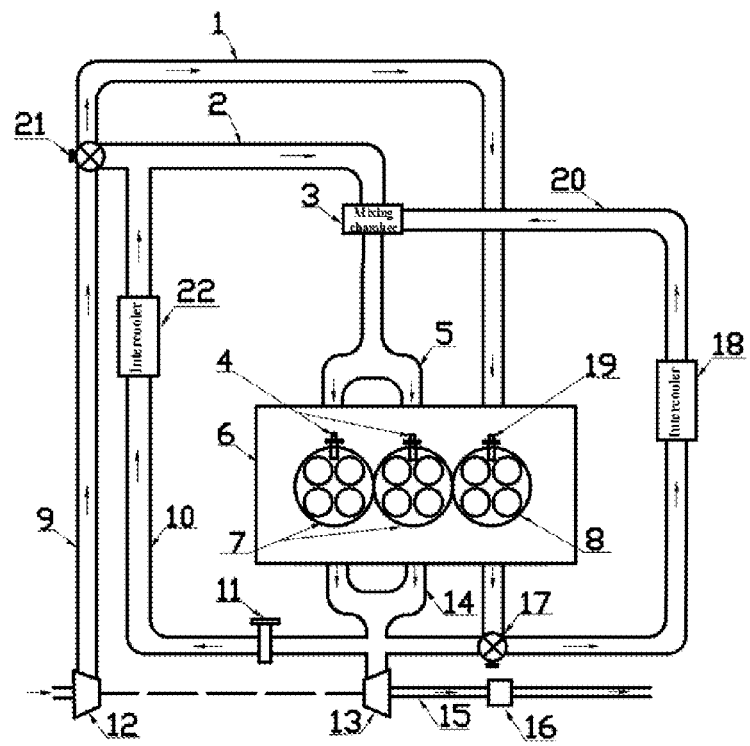
FIG. 1 is a structural diagram of the high-octane fuel engine under the FCE mode of the present disclosure.

Wherein the list of reference signs is as follows:
1 flexible cylinder air inlet pipe
2 working cylinder air inlet pipe
3 mixing chamber
4 working cylinder injector
5 working cylinder air inlet manifold
6 engine
7 working cylinder
8 flexible cylinder
9 main air inlet pipe
10 EGR pipe
11 EGR valve
12 supercharger
13 turbine
14 air outlet pipe
15 main air outlet pipe
16 post-treatment device
17 three-way exhaust valve of the flexible cylinder
18 reforming air intercooler
19 flexible cylinder injector
20 reforming pipe
21 three-way air inlet valve
22 EGR cooler 23 Inlet valve
24 exhaust valve

DETAILED DESCRIPTION OF THE EMBODIMENTS

The present disclosure will be further described accompanying with the figures and detailed embodiments, the embodiments are merely illustrative but not limiting.

In the present disclosure, the flexible cylinder is designed for two-stroke/four-stroke switching through adjusting valves, while the other conventional cylinders are designed for four-stroke. Compared to the flexible cylinder under four-stroke mode, the flexible cylinder in the present disclosure increases the production of reformed fuel to improve the reforming efficiency; the flexible cylinder can be converted to a four-stroke mode as the conventional cylinder when the engine is in a large load and needs sufficient power output. The FCE mode includes a flexible cylinder and a conventional cylinder, the specific working flow is as follows: the flexible cylinder is used for reforming the fuel, and the reformed products is cooled via pipelines and then routed with fresh fuel into the conventional cylinder for combustion. The present disclosure provides a novel engine comprising a two-stroke/four-stroke mode flexible cylinder and four-stroke mode conventional cylinders, wherein the activity of reforming products in the flexible cylinder can be regulated by controlling the switch-on time of the exhaust valve; when the flexible cylinder needs to be converted into a conventional cylinder due to the actual operating conditions, the flexible cylinder is converted into a four-stroke mode, the valves of which are same as the conventional cylinder, so that the engine can provide sufficient power output at a large load.

The control method of variable stroke engine for reforming high-octane fuel under the FCE mode of the present disclosure regulates and achieves in-cylinder two-stroke fuel reforming via valves strategy, so that the engine can obtain enough reformed products at a small load and can operate more efficiently and energy-efficiently. The novel engine controlled by combustion reaction path of the present disclosure comprises of an air inlet system, an operating system and a fuel reforming system, the structural diagram is shown in FIG. 1. The structure of the air inlet system and operating system of the present disclosure are same as that of the engine under FCE mode mentioned in Reference [13], but the valves in the fuel reforming system are optimized. The structural diagram of the engine in the present disclosure is shown in FIG. 1, which comprises an air inlet system, a plurality of working cylinders 7 and at least one flexible cylinder 8 (for example, three-cylinder engine comprises a flexible cylinder and two working cylinders, six-cylinder engine comprises two flexible cylinders and four working cylinders, forming a "one for two" mode), a turbine 13, a supercharger 12, a main air inlet pipe 9 connected to the supercharger 12, a three-way air inlet valve 21 provided on the main air inlet pipe 9; the main air inlet pipe 9 is divided into two ways via the three-way air inlet valve 21, one is a working cylinder air inlet pipe 2, the other is a flexible cylinder air inlet pipe 1, and a working loop is arranged between the main air inlet pipe 9 and the working cylinder air inlet pipe 2, a fuel reforming loop is arranged between the working cylinder air inlet pipe 2 and the flexible cylinder air inlet pipe 1; a turbocharger consists of a turbine and a supercharger; the exhaust gas from an air outlet pipe 14 drives the turbine 13, and the supercharger 12 drives the turbine 13 for compressing the inlet air; the three-way air inlet valve 21 controls the air distribution and flow direction of the air flew from the main air inlet pipe 9 so as to avoid exhaust gas in the EGR pipe 10 backflowing to the main air inlet pipe 9 due to pressure differences inside the pipes; the working cylinder air inlet pipe 2 introduces the air which passes through the three-way air inlet valve 21 or mixed gas mixed by EGR exhaust gas and air into the mixing chamber 3. The three-way air inlet valve 21 only permits inlet air in the main air inlet pipe 9 flowing into the flexible cylinder air inlet pipe 1 and the working cylinder air inlet pipe 2. The electronic control unit (short for ECU) connected to the engine controls the air distribution and flow direction via the three-way air inlet valve 21 to avoid exhaust gas backflowing to the main air inlet pipe 9 according to the pressure differences among the pipes of main air inlet pipe 9, flexible cylinder air inlet pipe 1 and the working cylinder air inlet pipe 2.

The working loop comprises the supercharger 12, the three-way air inlet valve 21, the working cylinder air inlet pipe 2, the mixing chamber 3, a working cylinder air inlet manifold 5, a working cylinder injector 4, working cylinders 7, an air outlet pipe 14, a EGR valve 11, a EGR cooler 22, a main air outlet pipe 15 and a post-treatment device 16, etc. The mixing chamber 3 is used for mixing the air from the working cylinder air inlet pipe 2 or the mixed gas mixed by EGR exhaust gas and air; the working cylinder injector 4 is used for controlling the fuel injecting time and fuel amount injected into the working cylinder; the EGR valve 11, provided on the EGR pipe 10, is used for controlling the amount of the exhaust gas introduced into the mixing chamber 3; the EGR cooler 22 is arranged on the EGR pipe 10 and located between the mixing chamber 3 and the EGR valve 11.

The fuel reforming loop comprises the flexible cylinder air inlet pipe 1, the flexible cylinder injector 19, the inlet valve 23, the exhaust valve 24, the flexible cylinder 8, the reforming pipe 20, a reforming air intercooler 18 and the mixing chamber 3. The process of fuel reforming loop is that the fuel enters into the flexible cylinder air inlet pipe 1, and successively passes through the flexible cylinder injector 19, the flexible cylinder 8, the reforming pipe 20, the reforming air intercooler 18, and finally reaches the mixing chamber 3; wherein the reforming air intercooler 18 is arranged on the reforming pipe 20 and located between the flexible cylinder 8 and the mixing chamber 3. The ECU connected to the engine controls the amount of fuel injected from the flexible cylinder injector 19 to the flexible cylinder 8 and controls the switch state of inlet valve 23 and exhaust valve 24 of the flexible cylinder 8, so that the flexible cylinder 8 can be switched between two-stroke mode and four-stroke mode according to the actual engine operating conditions.

Figure 2:
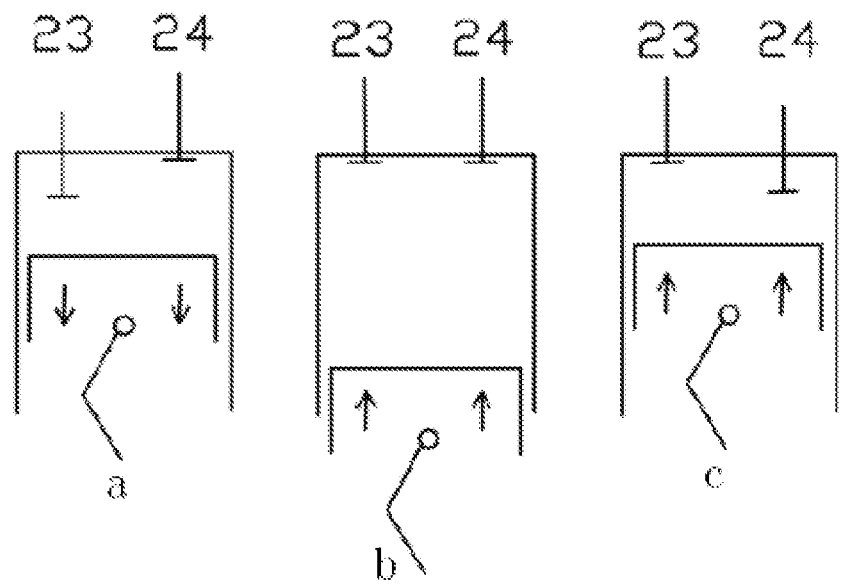
Figure 4:
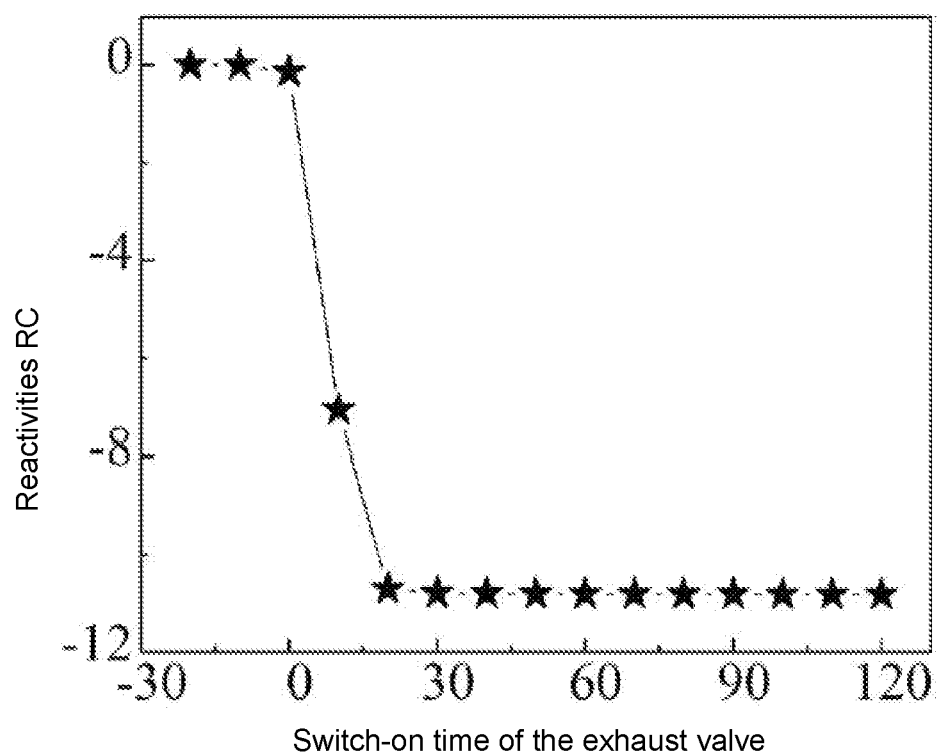
FIG. 4 is the diagram which shows the reactivity variation of the reformed products in the flexible cylinder at different switch-on time of the exhaust valve.

When the engine is at a small load and needs to promote combustion stability, the flexible cylinder injector 19 injects a rich fuel with equivalence ratio greater than 1 into the flexible cylinder 8, said flexible cylinder 8 is at two-stroke mode. As shown in FIG. 2, the process of reforming loop under two-stroke mode is as follows:

Step 1-1): switching off the exhaust valve 24, switching on the inlet valve 23, and introducing fresh air into the flexible cylinder 8;

Step 1-2): when the flexible cylinder 8 reached the bottom dead center (short for BDC), switching off the inlet valve 23 and the exhaust valve 24, and low-temperature compressing the high-octane fuel to be misfired reformed in the flexible cylinder 8;

Step 1-3): according to the reactivity curve of the reformed products of the flexible cylinder, selecting the switch-on time of the exhaust valve 24, deriving the reformed products with corresponding activity required by the engine from the flexible cylinder 8 and introducing it into the working cylinders 7. Wherein the reactivity curve of the reformed products of the flexible cylinder can be obtained by using the CHEMKIN software according to the reactivities of the reforming products are different at the different derivation moments. FIG. 4 shows the reactivity variation of the reformed products in the flexible cylinder at different switch-on time of the exhaust valve.

Figure 3:
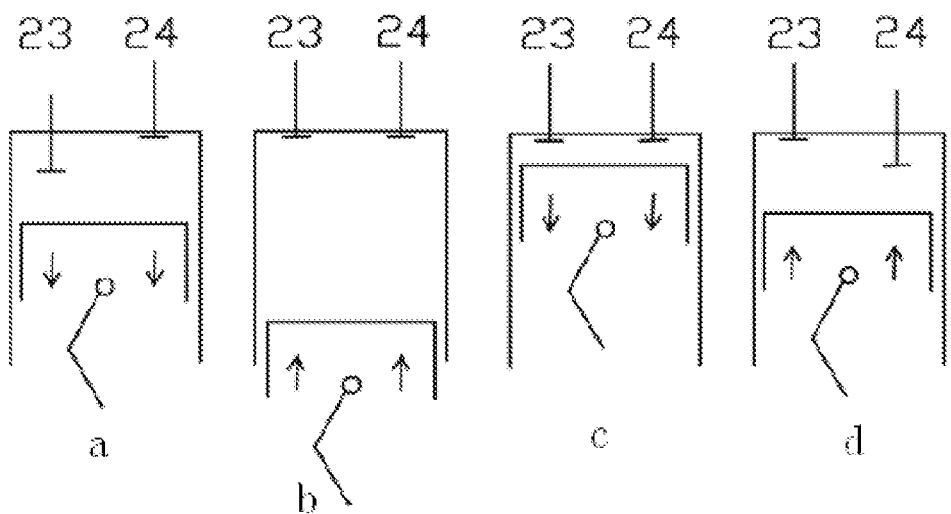

When the engine is at a large load and needs sufficient power output, the flexible cylinder injector 19 injects a conventional fuel into the flexible cylinder 8, said flexible cylinder 8 is at four-stroke mode. As shown in FIG. 3, the process of reforming loop under four-stroke mode is as follows:

Step 2-1): switching off the exhaust valve 24, switching on the inlet valve 23, and introducing fresh air into the flexible cylinder 8;

Step 2-2): when the flexible cylinder 8 reached the BDC, switching off the inlet valve 23 and the exhaust valve 24, and low-temperature compressing the misfired high octane fuel in the flexible cylinder 8;

Step 2-3): travelling down the piston of the flexible cylinder 8, and providing power to the engine;

Step 2-4): switching on the exhaust valve 24 to exhaust the combusted exhaust gas.

In conclusion, the ECU connected to the engine regulates the switch states of the flexible cylinder valves according to the operating conditions of the engine as follows: when the flexible cylinder acts as a reforming cylinder to reform the high-octane fuel, the operating mode of the flexible cylinder is two-stroke mode; when the engine's heavy load requires to output sufficient power, the flexible cylinder operates in the same mode as the conventional cylinders and converts to four-stroke mode. The present disclosure can switch the flexible cylinder operation mode between two-stroke and four-stroke mode. Therefore, during the reforming process of the flexible cylinder under two-stroke mode, The present disclosure can obtain different reforming mixture with different reforming degrees, i.e. different reactive reformed products, by controlling the switch-on time of the exhaust valve of the flexible cylinder, thereby satisfying the requirements of the engine requiring the reformed products with different activities within a wide range. Furthermore, the flexible cylinder under two-stroke mode can be reformed twice when the engine is in a normal four-stroke working process, so that the flexible cylinder can provide enough reformed products to the conventional cylinder to meet the engine requirements.

Although the functions and working processes of the present disclosure have been described above with reference to the accompanying drawings, The present disclosure is not limited thereto. The foregoing specific implementations are merely illustrative but not limiting. A person of ordinary skill in the art may make various forms under the teaching of the present disclosure without departing from the purpose of the present disclosure and the protection scope of the appended claims, and all the forms shall fall into the protection scope of the present disclosure.

What is claimed is:

1. A control method of variable stroke engine for reforming high-octane fuel under a flexible cylinder engine (FCE) mode, wherein
the variable stroke engine comprises an air inlet system, a plurality of working cylinders (7) and at least one combustion flexible cylinder (8);
the air inlet system comprises a turbine (13), a supercharger (12), a main air inlet pipe (9) connected to the supercharger (12), and a three-way air inlet valve (21) provided on the main air inlet pipe (9);
the main air inlet pipe (9) is divided into two ways via the three-way air inlet valve (21), one is a working cylinder air inlet pipe (2), the other is a flexible cylinder air inlet pipe (1), a working loop is arranged between the main air inlet pipe (9) and the working cylinder air inlet pipe (2), and a fuel reforming loop is arranged between the working cylinder air inlet pipe (2) and the flexible cylinder air inlet pipe (1);
the fuel reforming loop comprises the flexible cylinder air inlet pipe (1), a flexible cylinder injector (19), the at least one combustion flexible cylinder (8), the three-way exhaust valve (17) of the at least one combustion flexible cylinder (8), a reforming air intercooler (18), a reforming pipe (20) and a mixing chamber (3); wherein the reforming air intercooler (18) is arranged on the reforming pipe (20) and located between the at least one combustion flexible cylinder (8) and the mixing chamber (3);
an electronic control unit (ECU) connected to the variable stroke engine controls the amount of fuel injected from the flexible cylinder injector (19) to the at least one combustion flexible cylinder (8) and controls the switch state of an inlet valve (23) and an exhaust valve (24) of the at least one combustion flexible cylinder (8), so that the at least one combustion flexible cylinder (8) can be switched between two-stroke mode and four-stroke mode according to actual engine operating conditions;
when the variable stroke engine is at a small load and needs to promote combustion stability, the flexible cylinder injector (19) injects a rich fuel with equivalence ratio greater than 1 into the at least one combustion flexible cylinder (8), the at least one combustion flexible cylinder (8) is at two-stroke mode; when the variable stroke engine is at a large load and needs sufficient power output, the flexible cylinder injector (19) injects a conventional fuel into the at least one combustion flexible cylinder (8), the at least one combustion flexible cylinder is at four-stroke mode; wherein the process of reforming loop under two-stroke mode is as follows:

Step 1-1): switching off the exhaust valve (24), switching on the inlet valve (23), and introducing fresh air into the at least one combustion flexible cylinder (8);

Step 1-2): when the at least one combustion flexible cylinder (8) reaches the bottom dead center, switching off the inlet valve (23) and the exhaust valve (24), and low-temperature compressing the high-octane fuel to be misfire reformed in the at least one combustion flexible cylinder (8); and Step 1-3): according to the reactivity curve of reformed products of the at least one combustion flexible cylinder (8), selecting switch-on time of the exhaust valve (24), deriving the reformed products with corresponding reactivity required by the variable stroke engine from the at least one combustion flexible cylinder (8) and introducing it into the plurality of working cylinders (7).

2. The control method of variable stroke engine for reforming high-octane fuel under the FCE mode according to claim 1, wherein the reactivity curve of the reformed products of the at least one combustion flexible cylinder in Step 1-3) is to be obtained by using CHEMKIN® software according to the reactivities of the reformed products are different at the different derivation moments.

3. The control method of variable stroke engine for reforming high-octane fuel under the FCE mode according to claim 1, wherein the process of reforming loop under four-stroke mode is as follows:

Step 2-1): switching off the exhaust valve (24), switching on the inlet valve (23), and introducing fresh air into the at least one combustion flexible cylinder (8);

Step 2-2): when the at least one combustion flexible cylinder (8) reaches the bottom dead center, switching off the inlet valve (23) and the exhaust valve (24), and low-temperature compressing high octane fuel to be misfire reformed in the at least one combustion flexible cylinder;

Step 2-3): travelling down a piston of the at least one combustion flexible cylinder (8), and providing power to the variable stroke engine; and Step 2-4): switching on the exhaust valve (24) to exhaust combusted exhaust gas.

* * * * *